Patented July 21, 1953

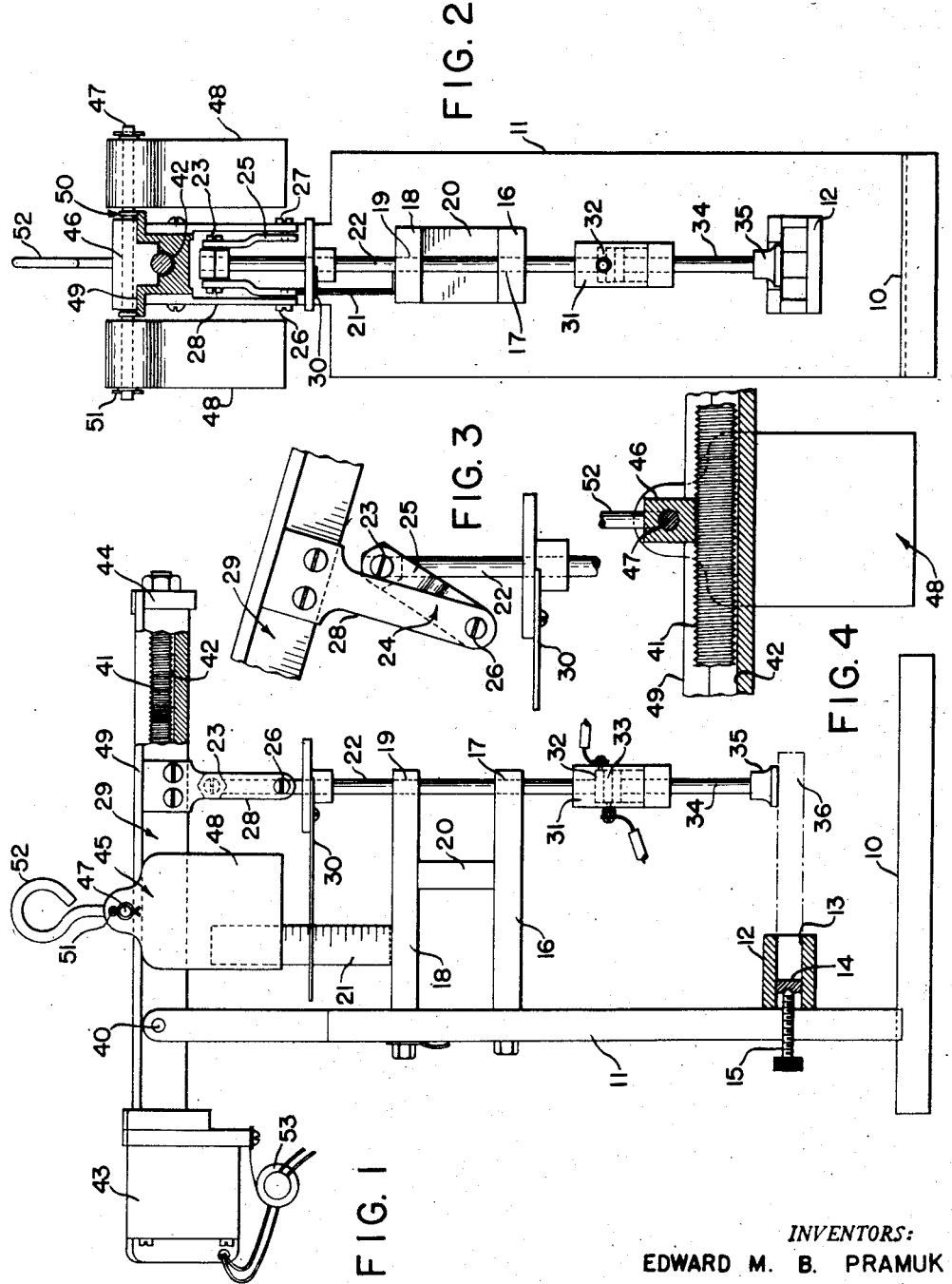

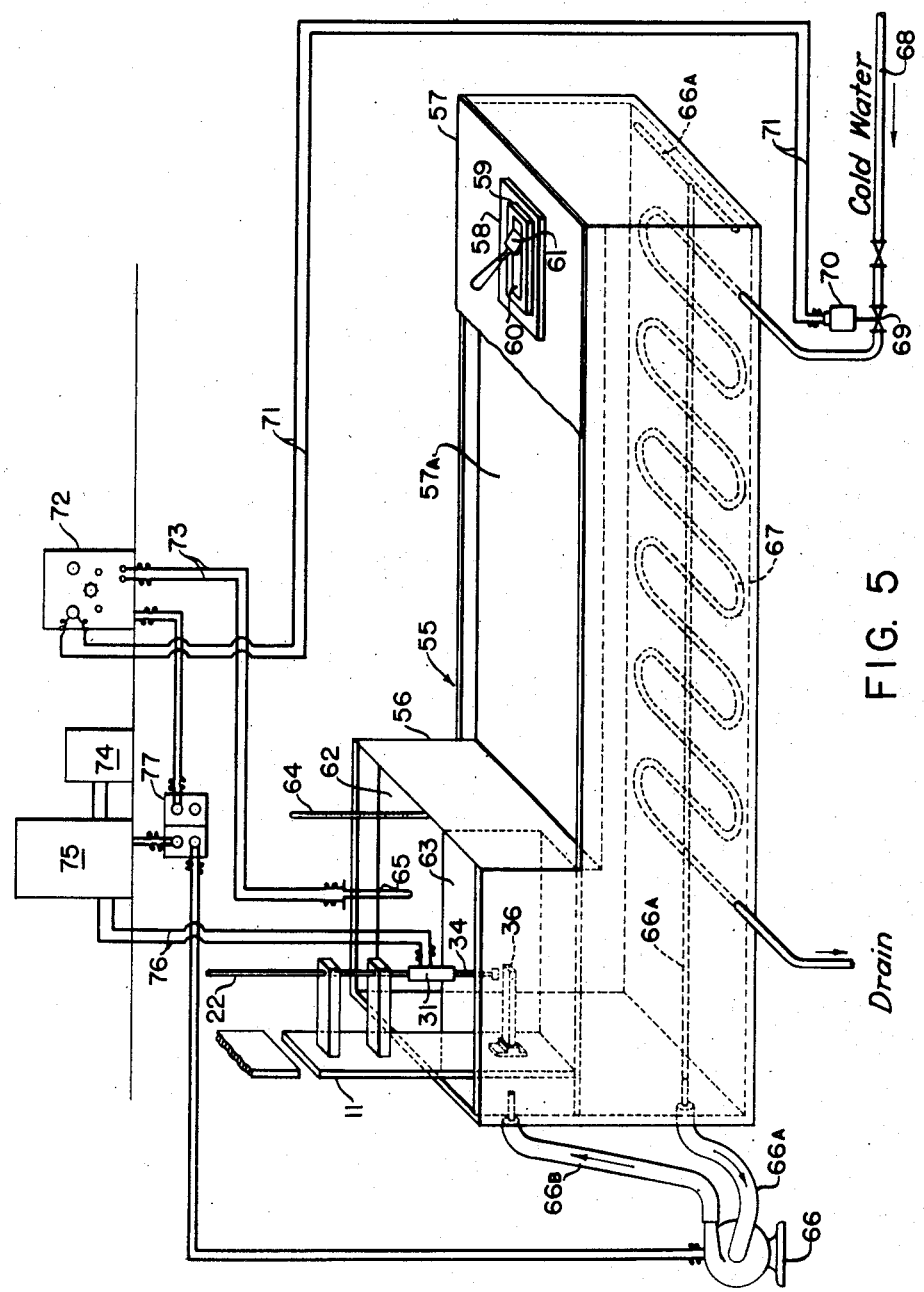

2,645,935

UNITED STATES PATENT OFFICE 2,645,935

BEAM LOADER APPARATUS

Edward M. B. Pramuk, Whiting, and Frederick H. MacLaren, Munster, Ind., assignors to Standard Oil Company, Chicago, Ill., a corporation of Indiana Application October 6, 1950, Serial No. 188,772

7 Claims. (Cl. 73—90)

This invention relates to an improvement in a beam loader for devices of the type wherein a progressively increased weight is applied in a vertical direction to a work piece. More specifically the invention relates to an improved means for the testing of plastic materials by application of force thereto.

There are well established methods of evaluating characteristics of plastic materials such as paraffin wax, asphalt and the like, and heretofore it has been proposed to determine flow characteristics, bending properties, penetration and the like, by the application of a force to test bars or panels of plastic substances. However, the prior devices and systems have been cumbersome and incapable of giving accurate and reproducible results. Strains and torsion effects on the test bar during test, and the rapid and irregular rate of load application gave erratic results. Accordingly, it is a primary object of this invention to provide means which avoid these difficulties and will give an accurate and reproducible indication of the characteristics of plastic substances.

A further object is to provide an apparatus which is capable of applying a progressively increasing force downwardly upon a test bar. Still another object is to provide a beam loader which is rugged and foolproof without sacrificing incremental accuracy. These and other objects of the invention will become apparent as the detailed description of the invention proceeds.

By the invention a system is provided whereby a horizontal loading beam moves a loading spindle in a vertical direction by the uniform application of a weight traveling along the beam and the spindle is attached at its upper end to the loading beam by means of a novel non-binding linkage.

The invention will be more clearly understood from the following detailed description of a specific example thereof read in conjunction with the accompanying drawings wherein:

Figure 1 is a schematic side view of the improved apparatus assembly;

Figure 2 is an end view of the apparatus partly in section;

Figure 3 is an enlarged side view of a portion of the non-binding, reverse or tension linkage showing details thereof;

Figure 4 is a detail partly in section showing the construction of the movable suspended weight assembly; and Figure 5 is a schematic isometric drawing illustrating the test equipment generally as used when testing paraffin wax.

While the test procedure and apparatus described herein may be applied to a variety of materials exhibiting plastic flow, the primary purpose is to test bending properties of paraffin wax as an index of coating characteristics, and the invention will therefore be described as applied to the testing of an ordinary paraffin wax of commercial grades ranging from 122° F. melting point to 142° F. melting point.

The tester itself as shown in Figures 1 and 2 comprises a base 10 carrying an upright support 11 at the lower part of which is secured the specimen holder 12. This specimen holder or holding jig 12 is provided with a rectangular channel 13 which is one-half inch by one-half inch in cross section and one inch deep. At the back of this opening is provided a square follower 14 secured to a threaded plunger rod 15 which extends through an opening in the back of the jig 12 and through a threaded opening in the support 11. This follower and plunger rod assembly provides a means for ejecting any of the test sample which remains within the opening after the completion of the test. About four inches above jig 12 is provided transverse support 16 having a bearing 17 at its outer end, and about two inches higher is provided a second transverse support 18 having a bearing 19 at its outer end, the two transverse supports 16 and 18 being fixed to the upright support 11 and held in rigid position by brace 20. Instead of employing separate support bearings 17 and 19, a single elongated bearing extending between the two transverse supports 16 and 18 may be provided and this bearing can serve as a brace for the supports.

A light weight metal spindle 22, preferably of a non-rusting metal such as stainless steel or aluminum, is mounted within vertically aligned bearings 17 and 19. A slotted metal strip 30 is fixed to the spindle and fits over the scale 21 which extends upwardly from the transverse support 18. The strip 30 functions both as a pointer for the scale 21 and as a means for preventing rotation of the spindle 22.

At its upper end spindle 22 is pivotally attached about pin 23 which is a part of the non-binding, reverse or tension linkage 24 which includes the stationary yoke arms 28 rigidly attached to the loading beam 29 and a pair of doubly pivoted reverse link bars 25 which are pivotally attached by pins 26 and 27 between the top of the spindle and the lower end of the stationary yoke arms 28. The link bars 25 are of shorter length than the length of the yoke arms 28 and are offset at their upper ends to provide clearance for the pins as shown in Figure 2. This suspended reverse linkage 24 maintains the link bars 25 in tension and yoke arms 28 in compression when force is applied through the beam 29 to the spindle 22. We have found that this reverse linkage is essential for successful operation because the ordinary pitman linkage inevitably results in a binding or "freezing" of the spindle in the bearings in test apparatus of the type herein described.

At the lower end of spindle 22 is a connecting yoke 31, preferably fabricated of "Lucite," containing a fixed switch element 32 and a movable switch element 33, the latter being vertically movable within the yoke 31 and secured to a lower spindle 34 which extends through an opening in the bottom of the yoke 31 and has removably secured at its base a bearing member or penetrator element 35. In the testing of wax, the bearing member 35 is slightly larger than one-half square inch and rests on the outer end of a wax test bar 36 when the opposite end of said test bar is inserted in the jig 12. This provides a cantilever test beam with an effective length of about 2½ inches and with a cross section of one-half inch by one-half inch.

The beam loading assembly includes a channeled beam 29 pivoted at 40 on the upper end of support 11. A threaded shaft 41 is arranged within channel 42 and is journaled at its opposite ends to the motor 43 mounted on the end of the beam 29.

The suspended self-adjusting weight assembly 45 includes traveling block 46, a pivotal weight support 47 carried by said block, and a pair of weights 48 suspended from support 47 at each end thereof, preferably on low friction surfaces so that the weights always hang vertically, i. e. are self-adjusting. This assembly is adapted to ride on beam rails 49 and roller bearings 50 with the thread-engaging surface of block 46 in engagement with the exposed upper portion of the rotatable threaded shaft 41. The self-aligning weights 48 are suspended in such a manner that the center of gravity of the weights is below the beam 29. By this arrangement, the weights furnish a one-component force, i. e. vertically downward, for all positions of the beam under ordinary deflections of the beam and this arrangement has been found to give a remarkably more stable operation than was obtainable with weights having a center of gravity above the horizontal plane of the beam. A stop means, such as cotter keys 51, retain the pendulum weights 48 on the end of weight support 47 which passes through a bore in the block 46. A hook or handle 52 is fixed to the block 46 for lifting the weight assembly as a unit to be positioned at the desired initial point along the beam 29 on worm or shaft 41.

The increased weight is applied to the spindles 22—34 by rotating the threaded shaft 41 by means of the motor 43 (having a unitary speed reducer unit) at the desired rate and as the weight assembly 45 moves outwardly along the beam 29 from the pivot or fulcrum 40, the increasing force is applied.

As the loading beam 29 tilts downwardly, the yoke arms 28 which are rigidly fixed to the beam 29 displace the lower ends of the reverse link bars 25 laterally as shown in Figure 3 while applying a downward force to spindle 22 through pin 23. By this reverse linkage arrangement there is no tendency for the spindle 22 to bind and it moves in a vertical direction within the bearings 17 and 19.

The tester hereinabove described is operated with the test bar 36 submerged in a constant temperature water bath. A preferred general apparatus assembly is illustrated in Figure 5 and it comprises an L-shaped, constant temperature water bath assembly 55 with the water level maintained sufficiently high in the upwardly extending portion 56 of the vessel so that the flat top enclosure 57 of the shallow part of the vessel is constantly in actual contact with water and hence maintained at water bath temperature. Polished steel plates 58 are positioned on the upper surface 57 of the water bath chamber to serve as a base for stainless steel molds 59. The molds are ½ inch thick with cavities 60 which are ½ inch by 3⅝ inches. A lid or cover is preferably provided to fit over the molds to prevent heat transfer between the molds and the ambient atmosphere. After all of the wax has been poured and set in the molds, the excess is stripped from the top of the test bars by a sharp-edged tool 61.

The open test bath within the upwardly extending portion 56 of vessel 55 may be divided into a specimen curing compartment 62 and a tester compartment 63. Within curing compartment 62 are thermometer 64 and temperature control element 65. The bottoms of compartments 62 and 63 and the wall therebetween are all constructed of open mesh material so that water may circulate freely throughout the compartments. Circulation is effected by means of pump 66 which picks up water from the lowermost part or sump of the vessel 55 through suction tube 66a and continuously circulates it into the upper part 56 of the vessel through tube 66b. The temperature of the water bath is carefully controlled, and in wax testing is preferably held within 0.1° F. of 70° F., by circulating cooler water through heat exchanger coil 67 (which may be a copper coil about ¼ inch in diameter), said cooler water being introduced through line 68 at about 45° to 55° F. in amounts controlled by valve 69 which is actuated by solenoid 70 connected by conductors 71 to relay 72 which in turn is connected by conductors 73 to the temperature control element 65 in compartment 62. The temperature control element 65 may be a bimetal thermo-regulator or an electronic temperature control device selected from types well known in the art.

The tester illustrated in the drawings and hereinabove described in connection with Figures 1 and 2 is placed in compartment 63 so that the circulating constant temperature water is maintained above the level of the test bar 36. An electric clock or timing device 74 is connected to relay 75 which is connected by conductors 76 to the switch 32—33, so that the relay 75 starts the timer 74 and the motor 43 on the beam 29 when switch 32—33 is closed and stops them when the switch is opened by spindle 34 falling downwardly within the yoke 31. Relays 72 and 75 as well as the motor for the pump 66 and the motor 43 for the beam loader assembly are connected to a power source 77. The condenser 53 is wired through the motor 43 to relay 75 to protect the motor and the relay from excessive voltages as is customary with good engineering practice when using inductive devices which may be subjected to high voltages in the opening and closing of a control circuit.

When the bars 36 have cured for one hour in their original position on the upper face 57 of the water bath vessel 55 with the lid on, the test bar is removed from the mold 39 and placed in one of the compartments 62 and 63 where the sample is submerged in water in the constant temperature bath for at least one and one-half hours before the test. A sample bar is removed from curing compartment 62 and immediately inserted in channel 13 of holding jig 12 for test. Initially spindle 22 is held up sufficiently high by the loading beam 29 so that switch 32—33 is open.

The timer is set at 0.0 second, and the spindle 22 is gently lowered, with the spindle 34 at rest on the end of the test bar 36, until switch element 32 contacts element 33 on spindle 34 to close the relay circuit and thereby start the timer 74. The initial weight applied to the spindle assembly 22—24 is one-fourth pound. The weight assembly 45 is moved along the loading beam 29 by rotating the threaded rod 41 and after about 5 seconds an additional one-fourth pound weight has been added to the spindle 22. This application of weight at the rate of about ¼ pound for each five seconds is continued and the deflection reading on scale 21 is taken at about five second intervals as the test specimen 36 bends downwardly. When the test specimen breaks, the weight of spindle 34 causes it to fall downwardly within yoke 31, thereby opening switch 32—33 and immediately stopping the timer 74. It will be understood, of course, that the timer 74 may be started and stopped in accordance with the movement between spindle 22 and spindle 34 by other than electrical means, for example by mechanical, pneumatic, hydraulic or other means.

The recorded time in seconds needed to break sample (usually an average of three tests) is the so-called index number of the particular wax which is being tested. If the index number is below 26, the test may be repeated by applying ⅛ pound weight to the spindle assembly after five seconds instead of the ¼ pound weight, and the number of seconds indicated by the timer in an average of three tests is referred to as the "index of modified test."

In addition to recording the time necessary to break the test bar as a quality index with respect to resistance to blocking and sealing strength in actual commercial use, melting point distribution in the wax sample can be indicated by noting bar deflection measurements with respect to time. Thus it is contemplated that a recorder may be made to measure and record deflection of the wax bars. Specifically, the deflection of pointer 30 on scale 21 may be automatically recorded or logged with respect to time and correlated with melting point distribution in the sample of paraffin wax.

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. For example, the apparatus may also be used in hardness, compression, and penetration tests, in addition to determining deflection of standard beam sections as described above. Thus in general, the device may be employed in conventional testing procedures broadly where it is desired to apply a uniformly increasing force to a test stample at a controlled rate. Accordingly, modifications are contemplated which may be made without departing from the spirit of the described invention or of the scope of the appended claims.

What we claim is:

1. Apparatus for material testing which comprises means for applying an increasing load at a low uniform rate to a test sample, said means including a loading beam, a pivot means for supporting said beam, a channel in said beam aligned substantially parallel to the longitudinal axis thereof, the edges of said channel providing parallel guide rails, a driven threaded shaft in said channel, a superposed removable weight carrier movably supported by said beam on said guide rails and moved therealong by said shaft, pendulum weight means carried by said carrier with their centers of gravity below that of the beam, a vertical load-applying spindle under said beam, and an underslung linkage between said loading beam and the upper end of said load-applying spindle, said linkage comprising a link bar member pivoted at its lower end to said loading beam below the upper end of said spindle and at its upper end to the upper end of said spindle.

2. Apparatus for testing properties of materials having plastic flow which comprises means for applying a gradually increasing load at a low rate on a test bar of the material, said means including a loading beam supporting a driven threaded shaft, a vertically aligning weight means adapted to threadably engage said shaft, a sectioned load-applying spindle, a suspended linkage between said loading beam and the upper end of said load-applying spindle, said load-applying spindle having a lower separable free-falling section adapted to engage said test bar, and electrical switch means which is broken by the separation of said spindle.

3. A test apparatus which comprises a jig for holding one end of a test bar, a loading beam supported above said jig, a worm carried by said beam, an electric motor fixed to one end of said beam and adapted to drive said worm, a pair of vertically aligning weights astride said beam and having support means for threaded engagement with said worm, a sectioned load-applying spindle, a suspended linkage means for supporting said load-applying spindle below said beam above the test bar, a bearing means for guiding said spindle, and means actuated by separation of the sections of said spindle for indicating when the spindle is not in contact with the test bar.

4. Apparatus for testing properties of materials having plastic flow which comprises a vertically movable load-applying spindle, a beam loader for applying a gradually increasing load to the upper end of said spindle, said loader including a horizontally disposed loading beam pivoted intermediate its ends, a driven threaded shaft supported by said beam and aligned therewith, a pendulum weight carrier means having a traveling block adapted to threadably engage the upper part of said threaded shaft, an electric motor means carried by said beam and adapted to drive said shaft, and a linkage between said loading beam and the upper end of said load-applying spindle, said linkage consisting essentially of a pair of spaced rigid arm depending from the sides of said beam, a pair of link bars pinned to the lower ends of said rigid arms and extending upwardly toward said beam, a transverse bearing means fixed to the upper end of said spindle and pin means through the upper ends of said link bars and through said bearing means forming a flexible underslung linkage which applies a downwardly pulling force to the said spindle.

5. Apparatus for testing properties of materials having plastic flow which comprises a jig for holding one end of a test bar, means for applying a gradually increasing load at a low rate to the test bar, said means including a driven threaded shaft means pivotally supported above said test bar, a vertically aligning pendulum weight means adapted to be moved along said shaft means, a sectioned load-applying spindle, an underslung linkage extending between said driven shaft means and the upper end of said load-applying spindle, said linkage comprising a link bar member pivoted at its lower end to said shaft means below the upper end of said spindle and at its upper end to the upper end of said spindle, said load-applying spindle having a lower separable, free-falling section adapted to apply force to a test bar held in said jig, and electrical switch means actuated by the separation of said free-falling section of said spindle.

6. The apparatus of claim 2 wherein the suspended linkage between the loading beam and the upper end of said load-applying spindle is underslung and comprises a yoke means depending from said loading beam below the upper end of said spindle, and a pair of link bar means pivotally fixed at their lower and upper ends to said yoke and said spindle, respectively.

7. The apparatus of claim 5 wherein the pendulum weight means includes a pair of vertically aligning weights, a transverse axle shaft supporting said weights on opposite sides of said shaft means, a traveling T-shaped block having a threaded groove for engaging the upper surface of the threaded shaft in said shaft means, a bore extending through the arms of said T-shaped block and receiving said axle shaft, roller bearing means between said weights and the ends of the arms of said block, guide rails on said shaft means supporting said roller bearing means, and lifting means fixed to said block for removing said pendulum weight means as a unit from said shaft means.

EDWARD M. B. PRAMUK.
FREDERICK H. MacLAREN.

References Cited in the file of this patent

UNITED STATES PATENTS

| Number | Name | Date |
|---|---|---|
| 399,754 | Keep | Mar. 19, 1889 |
| 476,082 | Sellon | May 31, 1892 |
| 534,994 | Buzby | Mar. 5, 1895 |
| 1,208,748 | Chew | Dec. 19, 1916 |
| 1,827,805 | Watts | Oct. 20, 1931 |
| 2,001,033 | Matherne | May 14, 1935 |
| 2,049,644 | Essen | Aug. 4, 1936 |
| 2,222,140 | De Iongh | Nov. 19, 1940 |
| 2,306,111 | Scott | Dec. 22, 1942 |
| 2,354,431 | Bosomworth | July 25, 1944 |
| 2,504,985 | Kallas et al. | Apr. 25, 1950 |

FOREIGN PATENTS

| Number | Country | Date |
|---|---|---|
| 353,729 | Great Britain | July 30, 1931 |